United States Patent
Sullivan

[15] 3,696,513
[45] Oct. 10, 1972

[54] THREE-PHASE GAUGING SYSTEM

[72] Inventor: Francis G. Sullivan, Coldwater, Mich.

[73] Assignee: Simpson Industries, Inc., Litchfield, Mich.

[22] Filed: March 19, 1970

[21] Appl. No.: 21,131

[52] U.S. Cl..................33/174 L, 73/483, 340/199
[51] Int. Cl....G01b 7/24, G01b 7/315, G01b 19/295
[58] Field of Search....33/174 L, 178 F, 180, 203.16, 33/203.19; 73/484; 340/199

[56] References Cited

UNITED STATES PATENTS 2,947,175  8/1960  King.....................33/206 D
2,192,363  3/1940  Moos..........................73/483

*Primary Examiner*—William D. Martin, Jr.
*Assistant Examiner*—Paul G. Foldes
*Attorney*—Beaman and Beaman

[57] ABSTRACT

A gauging system for determining the relative relationship of given locations on an item being gauged with respect to each other or a reference location utilizing multiple-phase alternating current, in particular three-phase alternating current, wherein the item being gauged is engaged at predetermined locations by electrical linear differential measuring devices each being energized by a separate phase of the alternating current supply, the output of the measuring devices being electrically interconnected and associated with electrical indicating means to give an electrical indication of the location of the sensing components of the electrical measuring devices and, hence, give an electrical indication of the physical characteristics of the item being gauged. With three-phase alternating current three electrical linear measuring devices are angularly spaced at 120° intervals about the reference support member supporting the item being gauged, and the electrical sensing circuit may include phase indication means to indicate the location of the maximum deviation of the item being gauged with respect to a reference surface or point.

2 Claims, 5 Drawing Figures

PATENTED OCT 10 1972

3,696,513

INVENTOR
FRANCIS G. SULLIVAN
BY Beaman & Beaman
ATTORNEYS

THREE-PHASE GAUGING SYSTEM

BACKGROUND OF THE INVENTION

The invention pertains to the method and apparatus for gauging given locations of an item, such as a workpiece, article of manufacture, or the like, utilizing a different phase of a multiple-phase alternating current supply source at measuring devices located at predetermined locations relative to the item being gauged, and in contact with the same, wherein the resultant output of the device is electrically measured, and an electrical indication of the physical characteristics of the item being gauged is thereby obtained.

In the manufacture of articles that are to be rotated about an axis during use, such as wheels, hubs, fan components, gears, couplings, vibration dampeners and the like, it often occurs that the item being manufactured consists of several components assembled in a predetermined manner, and in order to inspect the item for proper assembly, gauging and inspection techniques have been developed whereby the assembled components may be compared to reference surfaces, axes, points or shafts in order to insure that the assembly procedure has produced a product within the acceptable manufacturing tolerances. A common means of inspection involves the use of conventional dial indicators disposed adjacent a turntable upon which the item to be inspected is placed. The dial indicator engages the component to be gauged, and the item is rotated. Any eccentric characteristics existing upon the component being inspected will appear on the dial indicator.

Inspection techniques wherein the item being inspected must be rotated are time consuming and expensive. Also, relatively skilled operators must be employed to perform the inspection. A dial indicator is a sensitive instrument, and care must be exercised in its use to prevent damage thereto, and in production inspection procedures damage to dial indicators often occurs and replacement and repair becomes a major cost factor in such inspection procedures. Additionally, with inspection devices wherein rotation of the item to be gauged must occur, it is necessary to carefully maintain the rotating components of the inspection device in the best possible condition if the desired accuracy is to be maintained. The presence of foreign matter is a problem with such inspection devices, and wear must be compensated for in order to insure the desired accuracy.

Gauging and inspection apparatus utilizing electrical sensing components, such as switches, photoelectric cells, and other electrical components are known, and many of these electrical inspection arrangements perform satisfactorily, except that the cost of the equipment is usually very high. The present invention was developed to aid in the inspection of vibration dampeners, wherein an annular inertia member is assembled to a central hub member by an annular elastic ring compressed between the hub and inertia members. In that the assembly of the inertia and hub members relies upon the characteristics of the elastic ring, and as the vibration dampener is used with rotating components, such as shafts and wheels, it is important that the assembly be such as to accurately locate the inertia member on the hub in both the axial and radial directions. Prior to the development of the invention the location of the inertia member upon the hub, after assembly to the hub member, was checked by dial indicators, or conventional electrical engaging systems. The previously employed gauging apparatus was not considered fully satisfactory for reasons set forth above, and the present invention has been found to overcome many of the disadvantages of prior gauging and measurement systems of the aforedescribed type.

SUMMARY OF THE INVENTION

It is an object of the invention to provide a gauging or measuring method and system of an electrical type wherein a multiple-phase alternating current is utilized to produce an electrical signal that may be read upon a meter and directly indicates physical characteristics of the item being inspected, such as angular deviation with respect to a reference surface or axis, and indicates the extent of such deviation, as well as the location of the maximum deviation.

In the practice of the invention three-phase alternating current is employed in conjunction with three linear variable differential transformers mounted on a reference surface and each having a movable element associated with primary and secondary coils such that the location of the core determines the voltage output from the secondary coils. The transformers are located at 120° intervals about a reference axis upon which the item being gauged is placed, and the input primary coil of each transformer is supplied with a different single phase of a three-phase alternating current supply wherein each phase is displaced 120° with respect to the other phases. The transformer secondary outputs are connected in series, and the transformers are so located that upon the item to be gauged being placed upon the inspection fixture the movable elements of each transformer will assume an identical relationship to its secondary coils if that portion of the item being gauged is parallel to the reference surface. In such instances where no nonparallel deviation is present the output of the transformer secondary coils will be nullified due to the self cancelling characteristics of three-phase alternating current, and no output occurs.

The presence of inaccuracies in that portion of the item being inspected will cause the movable elements of each transformer to be related to its secondary coils in such a manner that a summation voltage results which is sensed by the voltage meter connected to the summation voltage output, and the extent of deviation will appear on the meter whereby the inspector may immediately appreciate the extent of inaccuracy occuring in the item and determine whether it falls within the permissible limits.

In the process of inspection there is no rotation of the item, yet "runout" occurring in the axial direction with respect to the axis of rotation of the item being gauged will be indicated, or the eccentricity of the portion being inspected will be indicated, and the invention provides an instant accurate electrical indication of the physical relationships of the components of the item being inspected without the occurrence of movement of the item. Additionally, by the use of a phase meter sensing the phase at one of the transformers, and comparing this phase with the phase of the summation output voltage of the secondary coils of the transformers, it is possible to locate the maximum or minimum deviation with respect to the transformer directly connected to the phase meter.

By the use of the inventive concepts axial runout, eccentricity, and other dimensional variations may be readily determined. Additionally, it is possible to use the concept of the invention in a static balancing environment whereby the weight distribution of an item to be rotated may be readily determined, and the existence of an unbalanced condition may be determined and accurately located whereby corrective measures may be easily instituted.

BRIEF DESCRIPTION OF THE DRAWING

The aforementioned objects and advantages of the invention will be appreciated from the following description and accompanying drawing wherein.

DESCRIPTION OF THE PREFERRED EMBODIMENTS

Figure 1:
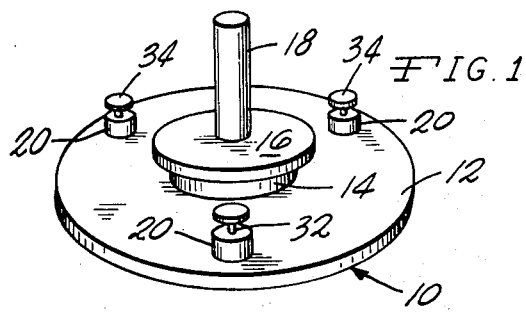
FIG. 1 is a perspective view of a basic gauging or inspection fixture utilizing the concepts of the invention where axial relationships of the item to be gauged are sensed.

The method of the invention may be practiced with a wide variety of physical apparatus, and in the drawings simplified versions of apparatus are illustrated in order to permit one skilled in the art to appreciate the preferred relationship of the basic components in the practice of the invention. In the drawings, the item being gauged and inspected is illustrated as constituting a torsional vibration dampener. Of course, the item being gauged may be of any type wherein portions or surfaces thereof are to be gauged or compared with respect to a reference surface or axis.

In FIG. 1 a typical arrangement of components is illustrated for gauging axial displacement or runout of a portion of an item to be inspected with respect to other portions of the item. In FIG. 1 a base plate is shown at 10 having an upper surface 12, and a pedestal 14 extends from the central region of the base plate having a reference surface 16 defined thereon which is parallel to the upper base plate surface 12. A shaft 18 extends from the center of the reference surface 16 and defines an axis. The axis of the shaft 18 may be considered a reference location, as may also the pedestal surface 16. Three identical electrical linear measuring devices 20 are mounted upon the upper surface 12 of the base plate as shown in FIG. 1. The devices 20 are located at equal radial distances from the axis of the shaft 18, and are angularly disposed at 120° about the axis of the shaft 18 with respect to each other.

Figure 5:
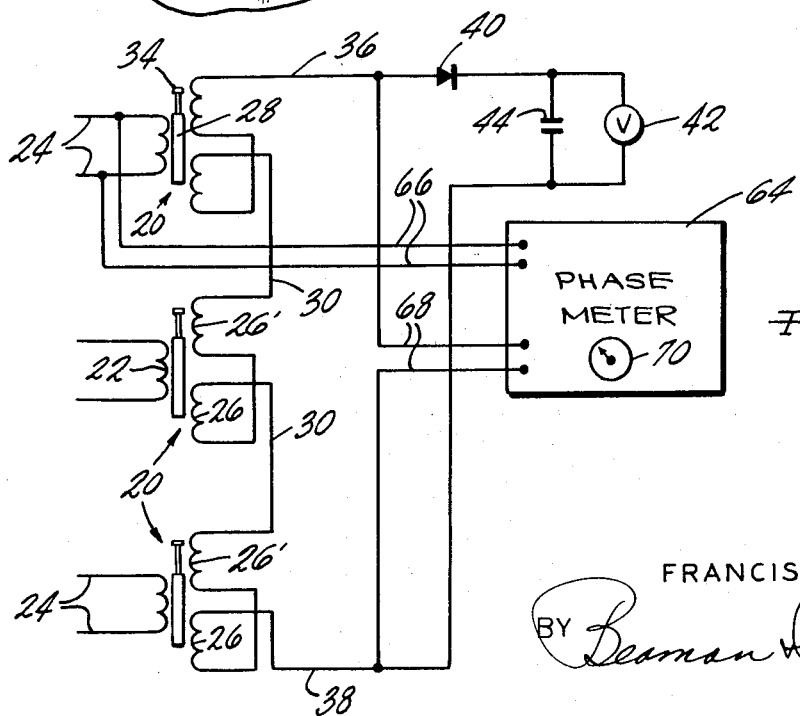
FIG. 5 is a view of a simplified electrical circuit utilizing the invention concepts.

While the devices 20 could constitute any electrical linear measuring device having the desired characteristics, in practice, the devices 20 may be linear variable differential transformers which include, with reference to the circuit of FIG. 5, a primary coil 22 having input conductors 24 associated therewith. A pair of secondary output coils 26 and 26' wound in opposite directions, are associated with the primary coil 22, and a permeable core 28 is slidably mounted within the bore of the transformer housing for movement through the bore of the transformer about which the coils 22 and 26 are wound. In that the secondary coils 26 and 26' are wound in opposite directions, a predetermined position of the core 28 within the coils provides a "null" position of the transformer wherein no voltage output through the secondary output conductors 30 occurs. Also, it is desired that the transformer cores be provided with an extension in the form of a threaded rod 32 having a head 34 which may be axially adjusted in order to initially determine the desired position of the core within the associated transformer. In one embodiment of the invention the transformers 20 were manufactured by C-E Electronics, Inc., of Glenside, Pennsylvania, and Model No. 040-60-2 was used which has a linear range of ±0.040 inches. The outer diameter of the transformers is 7/8ths of an inch, and the transformer has a bore 5/16ths of an inch in diameter and the body length is 1 1/8ths inches.

With reference to FIG. 5, the transformer secondary coil outputs are connected in series wherein conductors 36 and 38 form a summation voltage output circuit. A diode 40 is preferably included in the circuit to rectify the alternating current signal produced, whereby a direct current volt meter 42 is connected across the conductors 36 and 38. A condenser 44 is also employed in the circuit across the conductors 36 and 38 to take pulses out of the rectifier alternating current to produce a more uniform signal at the volt meter 42.

Figure 2:
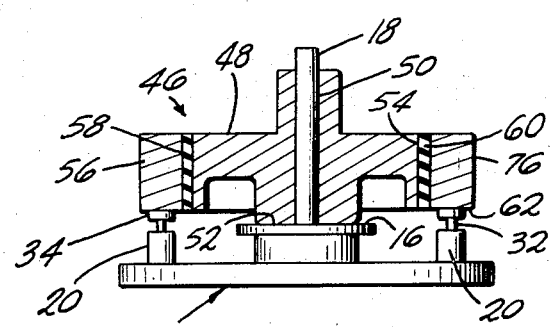
FIG. 2 is an elevational, sectional view of the apparatus of FIG. 1 in use, illustrating the apparatus as used to sense possible axial deviation of the inertia member of a vibration dampener as compared with the hub member.

In use, the apparatus of FIG. 1 may be employed as shown in FIG. 2. In this figure a torsional vibration dampener generally indicated at 46 has been placed upon the shaft 18 and the pedestal reference surface 16. The vibration dampener includes a hub member 48 having a coaxial bore 50 which closely receives the shaft 18 that the hub may be accurately radially located with respect to the axis of the shaft. Additionally, the hub member includes an end surface 52 which directly engages the reference surface 16 and thereby axially locates the hub with respect to the apparatus. The hub member 48 includes an outer cylindrical surface 54, and in spaced opposed relationship thereto is located an annular inertia member 56 having an opposed inner cylindrical surface 58. An elastic material 60, such as of rubber, is compressed intermediate the surfaces 54 and 58 which maintains the assembly of the hub and inertia members. The inertia member includes a radial end surface 62. The general type of vibration dampener shown in FIG. 2 is described in greater detail in U.S. Pat. Nos. 3,088,332 and 3,280,654.

Upon placing the vibration dampener 46 upon the gauging apparatus as shown in FIG. 2, the inertia surface 62 engages the heads 34 of the movable core elements 28 of the linear variable differential transformers 20, as shown. In this manner the inertia member 56 is engaged at equal radial distances from the axis of the shaft 18 at 120° intervals with respect to its circular configuration. The threaded rods 32 on the transformer cores are adjusted such that the associated core 28 will be positioned in its null or zero voltage output position when the inertia member 56 is properly axially located with respect to the hub member 48.

In use, to gauge or inspect the possibility of axial "runout" or deviation of the inertia member 56 with respect to the hub member 48, the vibration dampener is merely placed upon the shaft 18 to engage the reference surface 16 as shown in FIG. 2, and described above. This action will automatically position the cores 28 of the linear variable differential transformers 20 to a location dependent upon the location of the inertia member relative to the hub member. Thereupon, the primary coils 22 of all three transformers are each energized with a different phase from a three-phase alternating current source wherein each phase is displaced 120° with respect to the other phases. Accordingly, if the core of any of the transformers is displaced from its zero or null voltage position a voltage will be produced by that transformer linearly proportional to the distance the core is displaced from its zero voltage position. This voltage is introduced into the series circuit interconnecting the secondary coils of the transformers 20 and the output of all of the transformer secondary coils constitutes the summation output across the conductors 36 and 38. Accordingly, the volt meter 42 will indicate a voltage proportional to any tilt of the inertia member 56 relative to the hub member 48, and by the use of proper calibration, the volt meter may give a direct reading with respect to thousandths of an inch of deviation of the inertia member relative to the hub member. Accordingly an unskilled operator may quickly determine whether or not the vibration dampener assembly is acceptable. If a digital reading volt meter is utilized, reading of the volt meter is particularly facilitated by unskilled personnel. It will be appreciated that during gauging of the dampener that no rotation of the dampener takes place, as it is merely placed upon the shaft 18 and the reference surface 16.

The location of the "high" or "low" point of the inertia member with respect to the hub member, if a tilting or cocking is present, may be determined by the use of the disclosed circuit by adding a phase meter thereto as shown in FIG. 5. The phase meter 64 employed is of a conventional type and includes a movable coil supplied by conductors 66 which are connected to the input conductors 24 of one of the linear variable differential transformer primary coils 22 to sense the phase thereof. The other coil of the phase meter is fixed and is connected across the conductors 36 and 38 of the transformer secondary output by conductors 68 to sense the phase of the summation voltage. Thus, it is possible to directly obtain a reading from the phase meter indicator 70 which indicates the location of the maximum axial deviation of the inertia member 56 with respect to the hub member 48 in terms of degrees about the axis of the shaft 18 from the transformer 20 to which the phase meter is directly connected. The indication of the direction of the maximum axial deviation will depend on the phase angle between the signals in conductors 66 and 68.

Figure 3:
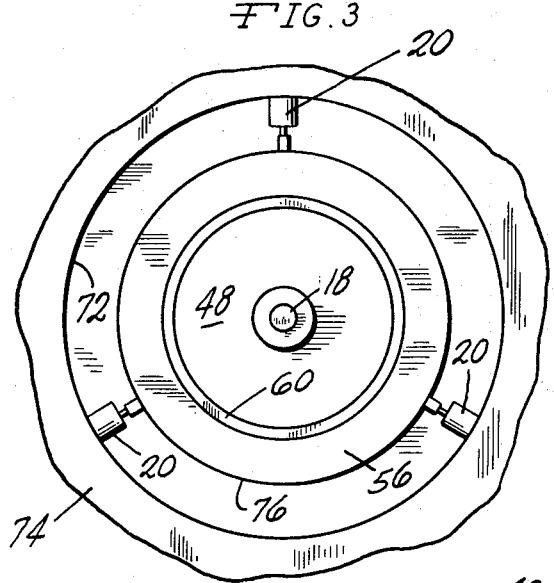
FIG. 3 is a top view of another embodiment of the invention utilized to gauge a vibration dampener inertia member for possible radial eccentricity with respect to the hub member.

FIG. 3 illustrates a variation in the relationship of the linear variable differential transformers 20 with respect to the apparatus holding the item to be inspected whereby the existence of eccentricity of the inertia member 56 of a vibration dampener 46 with respect to the axis of the shaft 18 and the hub member 48 may be determined. FIG. 3 is a plan view of apparatus identical to that shown in FIG. 2, except that rather than mounting the transformers 20 upon the base plate 10, the transformers are mounted upon the inner cylindrical surface 72 defined upon a fixture 74 fixed relative to the shaft 18 such that the surface 72 is concentric to the axis of the shaft. Of course, the transformers 20 are disposed at 120° intervals to each other, and the principle of operation is identical to that described with respect to FIG. 2 for determining any eccentricity of the hub inertia member 56 to the hub member 48. In the case of the arrangement of FIG. 3 the outer cylindrical surface 76 of the inertia member is that surface engaged by the transformer heads 34.

Figure 4:
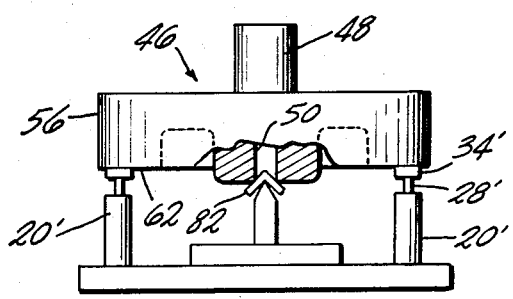
FIG. 4 is an elevational view, partially sectioned, illustrating one manner in which the inventive concept may be utilized to statically balance a rotatable member, such as a vibration dampener.

The concepts and principles of the invention may also be utilized for the static balancing of rotatable members, and FIG. 4 illustrates a schematic arrangement of apparatus to indicate the principles involved. In FIG. 4 the base plate 78 is utilized having three linear variable differential transformers 20' defined thereon in a manner identical to that shown in FIG. 1. The central pedestal shaft 80 includes a sharp point at its upper end which associates with a conical cap 82 concentrically related to the bore 50 of the vibration dampener hub member 48. In this manner, the vibration dampener 46 is balanced upon the shaft point, and any uneven weight distribution will cause a tilting of the dampener with respect to the base plate 78, and a resultant movement of the transformer cores 28' in that the transformer heads 34' are in engagement with the inertia member 56 of the dampener in a manner identical to that shown in FIG. 2. By use of the phase meter 64 the location of the "heavy" or "light" portion of the dampener may be readily determined and the hub or inertia member may be drilled at the location indicated to balance the dampener. Thus, balancing of a rotatable member may be achieved statically, and yet with a great degree of accuracy with the three-phase circuit of the invention. Of course, while FIG. 4 illustrates the balancing of a vibration dampener, any type of rotatable member may be balanced statically with the use of the apparatus of the invention with minor modifications to the elementary structure illustrated. In actual practice the location of support of the item being gauged will usually be above the item's center of gravity.

In the disclosed embodiments three electrical linear measuring devices have been shown spaced at 120° relative to each other about the reference axis, and it is considered within the scope of the invention to utilize specialized multiple-phase alternating current sources having more than three phases, and in such event a number of transformers would be used corresponding to the number of phases, and the angular spacing of the transformers with respect to the reference axis would be equal. In that three-phase alternating current is commercially available the disclosed embodiment is the most practical and economical to utilize.

I claim:

1. Gauging apparatus utilizing three-phase alternating current for a multi-portion item wherein the item includes a primary portion having an axis and a secondary portion mounted upon said primary portion, the secondary portion to be gauged with respect to said primary portion in the direction of said axis, said primary and secondary portions including reference surfaces perpendicularly disposed to said axis comprising, in combination, reference support means for supporting a multi-portion item to be gauged, said reference support means including an axis coincident with the axis of the item primary portion and a reference surface perpendicular to the support means axis engaging the reference surface of the item primary portion, three electrical linear displacement measuring devices fixed relative to said support means axis and reference surface at 120° intervals circumferentially spaced around said support means axis, each measuring device having an electrical primary input and an electrical secondary variable output means and a movable element movable in a direction parallel to said support means axis, each movable element having a contact surface engaging the item secondary portion reference surface upon the item primary portion being supported upon said support means axis and reference surface, said movable elements varying the output of the output means of the associated measuring device in accord with the movable element's position, a three-phase alternating current source having phases displaced 120° relative to each other, conductor means connecting a different phase of said alternating current source to each of said measuring devices' primary input, conductor means connecting said measuring devices' output means in series to define a summation output circuit, and voltage sensing meter means connected to said summation output circuit for indication the resultant summation output upon energization of said three-phase alternating current source to render an electrical indication of the position of said devices' movable elements as determined by the item secondary portion engaged thereby.

2. In a gauging apparatus as in claim 1, an electrical phase meter having a first input connected to the primary input of one of said linear measuring devices for sensing the phase thereof and a second input connected across said summation output circuit whereby said phase meter may indicate the location of maximum deviation of the item secondary portion being gauged with respect to the location of the measuring devices and the angular location of such deviation about the axis of the support means from the measuring device to which said first phase meter input is connected.

* * * * *